(12) United States Patent
Ferrari et al.

(10) Patent No.: US 9,938,161 B2
(45) Date of Patent: Apr. 10, 2018

(54) MONITORED RELEASE SOLID FEED SYSTEM

(71) Applicant: Evapco, Inc., Taneytown, MD (US)

(72) Inventors: Sarah L. Ferrari, Mount Airy, MD (US); John W. Lane, Finksburg, MD (US)

(73) Assignee: Evapco, Inc., Taneytown, MD (US)

( * ) Notice: Subject to any disclaimer, the term of this patent is extended or adjusted under 35 U.S.C. 154(b) by 773 days.

(21) Appl. No.: 14/301,629

(22) Filed: Jun. 11, 2014

(65) Prior Publication Data

US 2015/0151982 A1    Jun. 4, 2015

Related U.S. Application Data

(60) Provisional application No. 61/833,589, filed on Jun. 11, 2013.

(51) Int. Cl.
| | |
|---|---|
| *C02F 1/00* | (2006.01) |
| *C02F 1/68* | (2006.01) |
| *C02F 5/00* | (2006.01) |
| *C02F 103/02* | (2006.01) |

(52) U.S. Cl.
CPC .............. *C02F 1/008* (2013.01); *C02F 1/688* (2013.01); *C02F 5/00* (2013.01); *C02F 2103/023* (2013.01); *C02F 2209/00* (2013.01); *C02F 2209/05* (2013.01); *C02F 2209/11* (2013.01); *C02F 2303/22* (2013.01); *Y10T 137/0318* (2015.04)

(58) Field of Classification Search
CPC .. C02F 1/008; C02F 1/688; C02F 5/00; C02F 2103/023; C02F 2209/00; C02F 2209/05; C02F 2209/11; C02F 2303/22; C02F 1/687; Y10T 137/0318; B01F 1/005; B01F 1/0016; B01F 1/0022; B01F 1/0027; B01F 1/0033; B01F 1/0038; B01F 2001/0055; B01F 2001/0061
See application file for complete search history.

(56) References Cited

U.S. PATENT DOCUMENTS

| | | |
|---|---|---|
| 3,877,682 A | 4/1975 | Moss |
| 4,783,314 A | 11/1988 | Hoots et al. |
| 4,992,380 A | 2/1991 | Moriarty et al. |
| 5,419,347 A | 5/1995 | Carruth |

(Continued)

OTHER PUBLICATIONS

International Search Report issued in corresponding International Application No. PCT/US2014/041906 dated Oct. 1, 2014.

*Primary Examiner* — Lucas Stelling
(74) *Attorney, Agent, or Firm* — Whiteford, Taylor & Preston, LLP; Peter J. Davis

(57) ABSTRACT

A monitored release solid feed system having a solid chemical feed tank, a storage tank located below the solid chemical feed tank, and an automated valve. The solid chemical feed tank is loaded with a blend of inhibitors and an indicator-chemical in a solid form. A detector measures the amount of indicator in the recirculating water and periodically compares it to a setpoint. If the value is below the setpoint, the automated valve opens allowing water to pass through the storage tank and the solid chemical feed tank thus carrying inhibitors and a proportional amount of indicator-chemical into the recirculating system.

7 Claims, 9 Drawing Sheets

(56) References Cited

U.S. PATENT DOCUMENTS

| | | |
|---|---|---|
| 6,418,958 B1 | 7/2002 | Rossi et al. |
| 6,820,661 B1 | 11/2004 | Heimert |
| 7,883,638 B2 | 2/2011 | Sundaram et al. |
| 2002/0195404 A1 | 12/2002 | Pickens et al. |
| 2004/0154984 A1* | 8/2004 | Dafny .................... C02F 1/008 210/634 |
| 2005/0242042 A1 | 11/2005 | Moriarty et al. |
| 2012/0241045 A1 | 9/2012 | Aouad |
| 2013/0233796 A1 | 9/2013 | Rao et al. |

* cited by examiner

MONITORED RELEASE SOLID FEED SYSTEM

CROSS REFERENCE TO RELATED APPLICATION

This application claims priority from U.S. Provisional Application No. 61/833,589 filed on Jun. 11, 2013, and entitled "MONITORED RELEASE FEEDER," the specification of which is incorporated herein by reference in its entirety.

FIELD OF THE INVENTION

This invention relates to methods and apparatuses for introducing chemicals into a circulating system.

BACKGROUND OF THE INVENTION

Many systems such as cooling towers, fluid coolers, and condensers operate using make-up water that contains minerals. Pure water (mineral free) is lost from the system via evaporation resulting in the mineral concentration in the remaining water increasing. Periodically some of this highly concentrated water is removed from the system via blow-down and replaced with lower mineral content make-up water. This method results in a fairly consistent level of minerals in the recirculating water. The higher the concentration of recirculating minerals relative to make-up, the less amount of make-up water is used by the system. To allow proper operation at high mineral levels, chemical inhibitors are often added to the system to minimize the corrosion and scaling that would otherwise occur. Typically, these chemicals are in liquid form and are pumped into the system based on some estimate of the loss of chemicals by blowdown.

It is known that solid chemicals offer benefits over liquids. Much fewer pounds of solids are needed, there is no danger of a concentrated liquid spill during transportation and storage, and handling is simplified. The problem is that it has been difficult to accurately feed a solid inhibitor into a cooling system. Several different approaches have been tried. One such approach is exemplified by U.S. Pat. No. 6,418,958 and U.S. Pat. No. 6,820,661. These patents describe inventions where the solid chemical is first dissolved into a day-tank and then the liquid is pumped or aspirated from the day-tank into the system. These inventions require somewhat elaborate methods to dissolve the solid and still require pumps or other methods to get the liquid into the cooling system. These day-tank feed methods typically require that make-up water be used, not recirculating water, with the added risk of backflow contamination of the potable water system.

Another technique is to make a timed-release solid that will release at a more or less steady rate. An exemplary example of this technique can be found in U.S. Pat. No. 7,883,638 where solid chemicals are coated with an insoluble and semi-permeable membrane. The membrane is designed to allow the consistent release of chemicals. When the chemicals are fully released, the coating remains as a disposable waste. This technique can be very wasteful of chemicals as the release rate must be designed for the maximum amount of short-term blowdown on the system while most of the time the system is operating at less than full capacity. Also it is often difficult to run the chemicals until they are fully exhausted.

Many inhibitors are difficult to measure with a field test and often an indicator-chemical is analyzed to determine the concentration in the cooling system. U.S. Pat. No. 4,783,314 describes how an indicator-chemical, particularly one that fluoresces, can be added in a specific proportion to the liquid inhibitor and then the concentration of the inhibitor in the system can be determined by measuring the concentration of the indicator-chemical. Since the chemical fluoresces, this measurement can be determined by automated techniques. U.S. Pat. No. 4,992,380 describes how this technique could be used in a feedback loop to maintain a desired level of a liquid inhibitor in the cooling system.

SUMMARY OF THE INVENTION

According to an embodiment of the invention, a monitored release solid feed system is provided having a solid chemical feed tank with an inlet and an outlet, and optionally containing a coarse-mesh basket, a storage tank located below the solid chemical feed tank and connected to the inlet of the feed tank, and an automated valve to control when recirculating water enters the storage tank, passes through the solid chemical feed tank and returns to the recirculating system. According to operation of the system, the solid chemical feed tank is preferably loaded with a blend of inhibitors and an indicator-chemical in a solid form. The indicator-chemical, preferably a fluorescent substance, is preferably included in a precise ratio to the other active ingredients. A detector measures the amount of indicator in the recirculating water and periodically compares it to a setpoint. If the value is above the setpoint, no action is taken. If the value is below the setpoint, the automated valve opens allowing some water to pass through the storage tank and the solid chemical feed tank thus carrying additional inhibitors and a proportional amount of indicator-chemical into the recirculating system. The measurements and response actions are repeated frequently.

According to another embodiment, the solid chemical feed tank described above may be combined with a saturation-limited feed system of the type described in co-pending application Ser. No. 14/075,300, the entirety of which is incorporated herein by reference. According to the saturation limited feed system a basket constructed from a plastic mesh is located inside a water impermeable container referred to as a slug pipe. A saturation limited feed system works by loading an excess of chemical into the mesh basket and placing the mesh basket into the slug pipe. The slug pipe is filled with a specific volume of water and the chemical and water are allowed to stay in contact for a period of time. During this time, the chemical dissolves until it approaches its solubility limit. At this point, no additional chemical will dissolve into the water. When there is a need for a slug of chemical, a valve or series of valves is opened and water flows through the slug pipe displacing the chemical-saturated water with unsaturated water. The flush typical lasts for only a few minutes; little additional chemical is dissolved by the small amount of excess flush water. The dosage of the chemical is accordingly determined by the volume of the water in the slug pipe times the solubility of the chemical. Thus, according to a saturation limited feeder, the dosage of the solid chemical is controlled by the chemical's solubility equilibrium rather than the kinetics of dissolution as used in the prior art.

DESCRIPTION OF THE DRAWINGS

The subsequent description of the preferred embodiments of the present invention refers to the attached drawings, wherein.

DETAILED DESCRIPTION OF THE INVENTION

Figure 1:
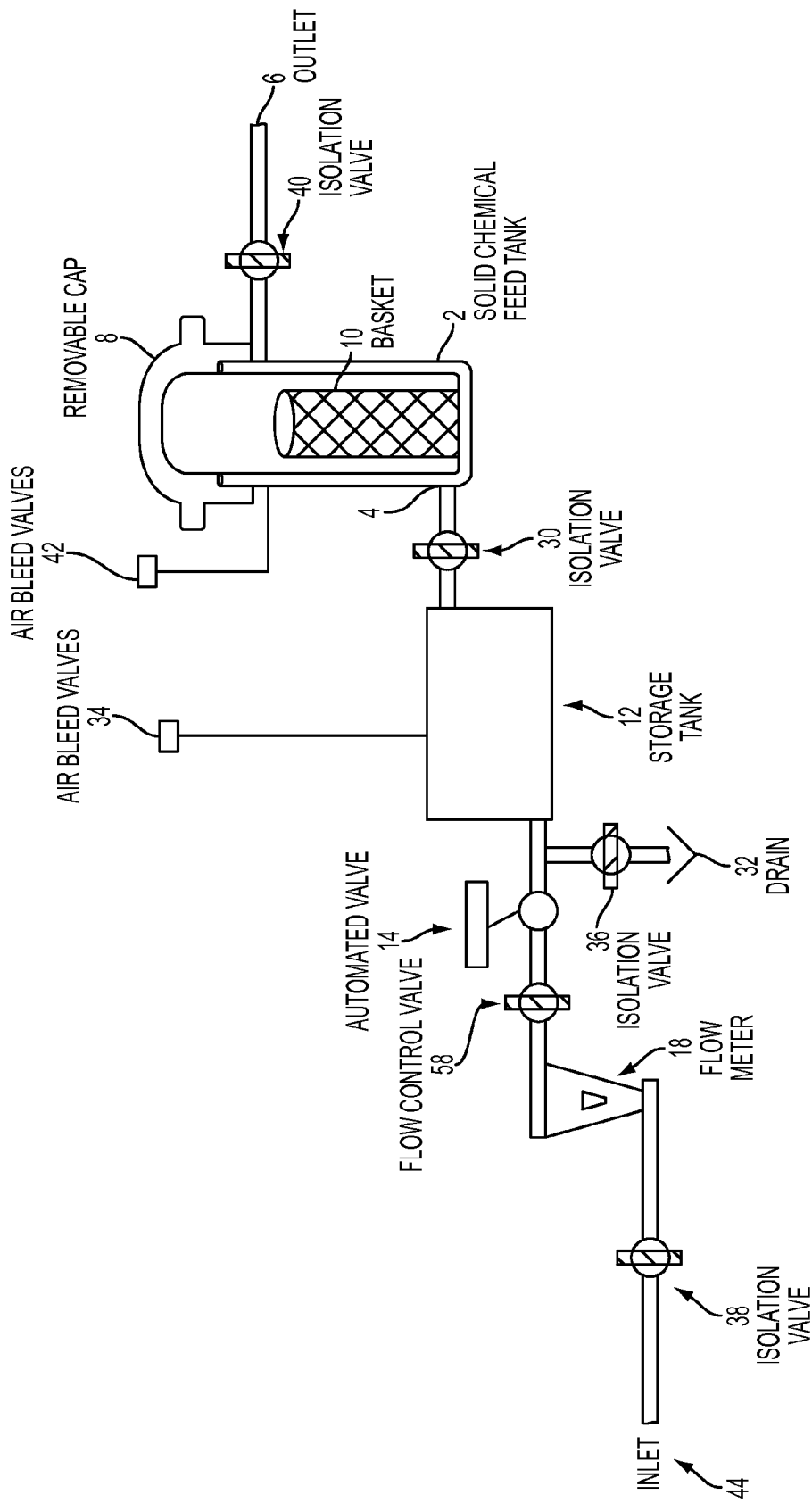
FIG. 1 is a schematic showing the major components of a monitored release solid feed system according to an embodiment of the invention.
Figure 2A:
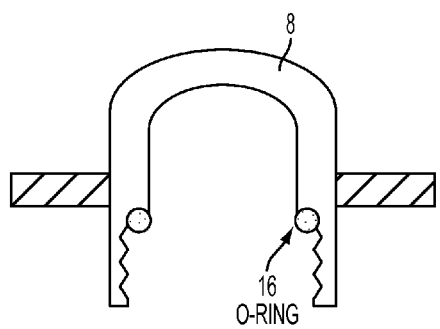
FIG. 2a shows a cross-sectional view of a threaded cap for a solid chemical feed tank according to an embodiment of the invention.
Figure 2B:
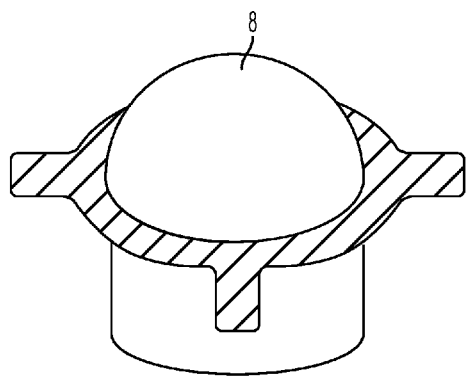
FIG. 2b shows an outside perspective view of a threaded cap for a solid chemical feed tank according to an embodiment of the invention.

FIG. 1 shows the major components of the system. There is an inlet 44 to the device from the recirculating water system. Solid chemical feed tank ("SCF tank") 2 has an inlet 4, an outlet 6, and a removable cover 8, with gasket 16. The SCF tank shown in FIG. 1 is fabricated from an 8" diameter pipe, but any shape tank can be used for this invention. If the SCF tank is not pressurized (i.e., the chemicals are overflowed into the cooling system) then the tank cover 8 can be omitted. Optionally, there can be a coarse-mesh basket 10 inside the SCF tank to hold the solid chemical. Storage tank 12 is located below the SCF tank 2 and connected to the inlet 4 of the SCF tank 2 such that inlet water must pass first through the storage tank 12 before entering the SCF tank 2. An automated valve 14 controls when recirculating water enters the storage tank 12 and goes through the SCF tank 2 and back into the recirculating system through outlet 6. When chemicals are needed in the recirculating system, the automatic valve 14 opens and water containing the treatment chemicals flows into the recirculating system. The monitored release solid feed system is piped with a flow control valve 58 or piping such that when automated valve 14 opens, a low-velocity of water passes through the system. For convenience it is useful to include a flow meter 18 in the loop so as to set the flow at a specific rate. For a system using an 8" diameter pipe as a tank, a flow rate of about ½ gpm was found to be ideal.

A blend of inhibitors will be made in a solid form, combined with a specific percentage of an indicator-chemical. According to a preferred embodiment, the indicator may be of the fluorescent type as described in U.S. Pat. No. 4,783,314, the disclosure of which is incorporated herein in its entirety. The active chemical is preferably comprised of phosphonates, azole, and appropriate polymers as known in the art; however it may consist of or include any known scale inhibitors, corrosion inhibitors, and inert ingredients. The solid chemicals are preferably very soluble in water in order to quickly dissolve or partially dissolve in the surrounding water in the solid chemical feed tank with the chemicals. The active chemicals preferably have approximately the same solubility so as to prevent selective leaching from occurring. For handling purposes, it is preferred that the solids are pelletized or briquetted; however, this is not essential for the invention provided the solids remain well-blended. For instance, a blend of granulated solids and indicator-chemical could be packaged in a water soluble container made from PVA with the entire container added when needed.

Figure 3:
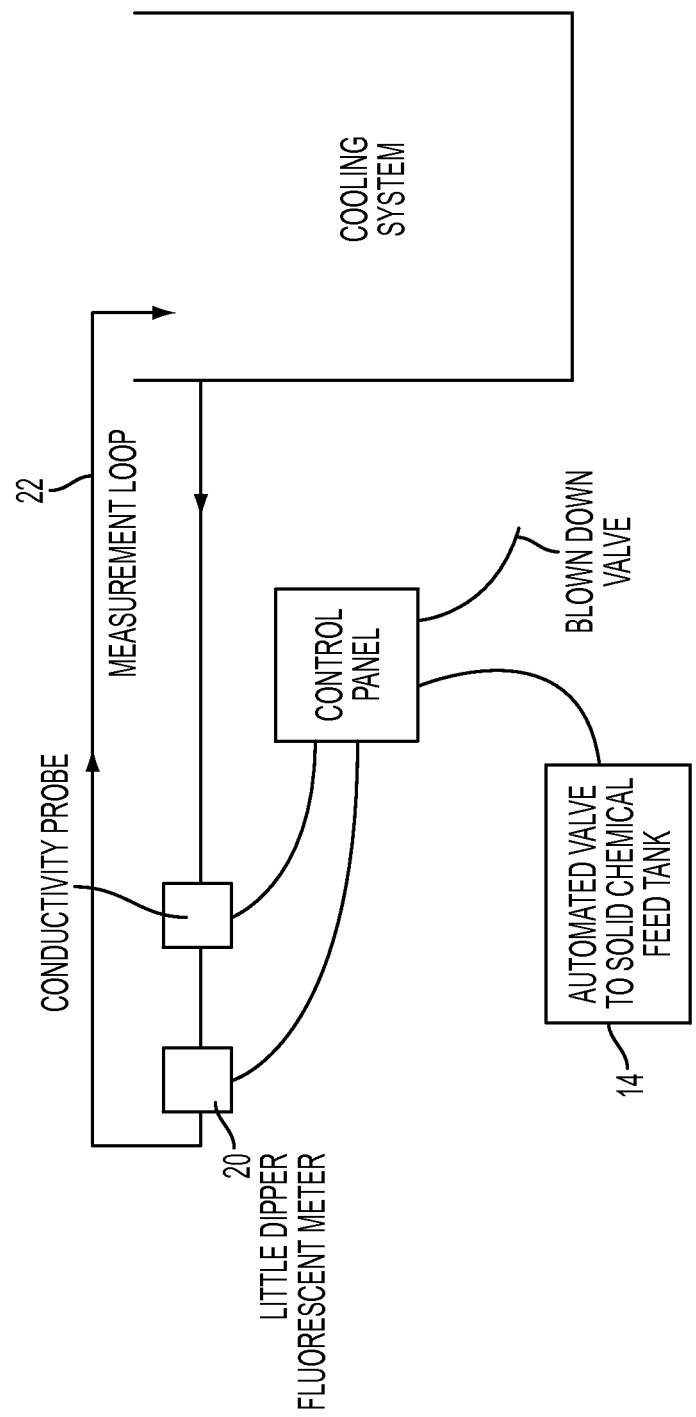
FIG. 3 is an illustration of a monitoring and control system for a monitored release solid feed system according to an embodiment of the invention.

FIG. 3 illustrates how the recirculating system is monitored. A representative stream of water flows through the measurement loop 22 and passes by a detection device 20 that detects the level of the indicator-chemical in the recirculating water. For this example, the Little Dipper in-line Fluorometer manufactured by Turner Designs of Sunnyvale, Calif., is shown, but any device able to selectively detect and quantitatively analyze the indicator-chemical can be used.

Figure 4:
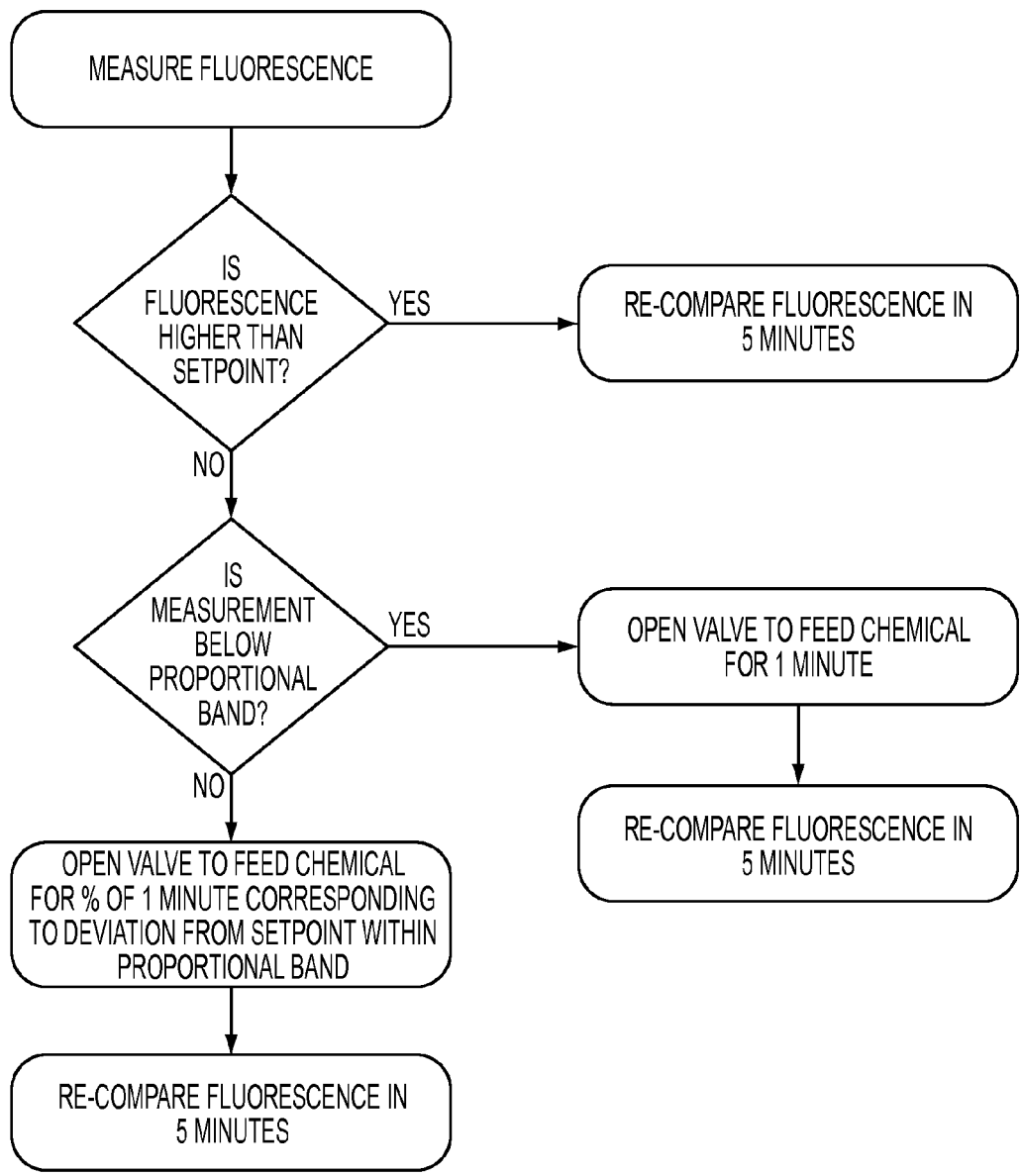
FIG. 4 shows a decision tree for operating an automatic feed valve according to an embodiment of the invention.

FIG. 4 shows the decision tree for how the measurement taken by the detection devices is used to determine when to add new chemical. Since the monitored release solid feed system operates by adding a highly concentrated solution of chemicals to the recirculating water, it is essential that a proper feed control mechanism is used. Accordingly, the measurement loop 22 is run continuously, and the quantitative level of the indicator-chemical is continuously measured by the detection device 20. Since the indicator-chemical is added in precise proportion to the active chemicals, the measurement represents the quantity of active water treatment chemicals in the system. Periodically the measurement is compared to a setpoint based on the designed amount of active chemical in the system. If the quantity is above the setpoint no additional chemicals are called for and a short time later the system will be evaluated again.

If the indicator-chemical level in the recirculating system is below the setpoint then the automatic valve 14 will open for a short period of time and send a concentrated slug of chemicals including additional indicator-chemicals into the system. The length of time can be a fixed or, preferably, it can be proportional to the deviation of the system measurement from the setpoint. It takes time for these additional chemicals to disperse in the system, and until they disperse, any immediate measurement by the detection device 20 will not represent the true level in the system. Therefore, after a specified delay to allow this dispersal, a reading of the new level of indicator-chemical is evaluated. If this level is again low another slug of chemicals is added to the system. This cycle will continue until the desired level of chemicals is reached. A good estimate of the required wait time between comparisons/evaluations is the turnover time of the system. The turnover time is defined as the system volume divide by the recirculation rate. Thus a system volume of 4,500 gallons with a recirculation rate of 900 gpm would have a turnover time of 5 minutes and 5 minutes would be a reasonable start point for a delay between comparisons to setpoint. The length of time that the automated valve is open as well as the flow rate will affect the amount of chemicals delivered with each slug. A person having ordinary skill in the art would be able to adjust these variables as well as the delay between comparisons of measured indicator level to setpoint so as to account for the different sizes, flow rates, loads, and configurations of various cooling systems.

According to another embodiment, the delay between comparisons can be equal to the maximum feed time; according to this embodiment, the system makes a comparison between the reading and the set point, and optionally adds chemicals as needed for a proportion of one minute, depending on the results of the comparison. At one minute after a first comparison, the system takes another reading and does a re-comparison with the setpoint. If this subsequent reading is above the setpoint, another reading and comparison will be conducted after another minute. If the subsequent reading is below the setpoint, chemicals are again added for a proportion of one minute based on the comparison. Although there will be a greater tendency to overshoot with this method, i.e., add more chemical than is necessary to meet the setpoint, it simplifies the control electronics and for many systems the overshoot is not significant.

FIG. 4 illustrates use of a time-proportional slug with the size of the slug varying with the deviation of the recirculating system measurement from the setpoint. Other methods may be used provided that the individual slugs are small enough to minimize over-shooting and that the time between dosing and measurement is sufficient to allow dispersion of the chemicals in the system.

This invention provides many benefits over the prior art. Firstly the invention is easily adapted to large systems. Prior-art solid feeders often require pre-packaged solids in fixed volume jars. There is limited amount of chemical that can be provided using the jar-approach. This invention solves this issue by permitting the use of any size SCF tank. Since solid chemistry is poured into the SCF tank, the size of the tank can be configured to accommodate the easy intake of a large amount of chemical. For very large systems or systems requiring a large quantity of blowdown and hence more replacement chemicals, a larger SCF tank can be used.

An additional advantage over the prior art is that recirculated cooling water can be used with the monitored release solid feed system, although make-up or other water could also be used such water is not necessary. The complexity of the prior-art system requires that potable water be used, not recirculating water. The need for potable water adds complexity to the piping and an increased danger of the backflow of chemicals into drinking water.

The prior art that uses a fluorescent indicator chemical requires that liquid chemicals be used and that these liquids be pumped into the recirculating system. This approach has the disadvantage of requiring the use of liquids with their potential for leaks and spills in shipping and handling. In addition, this form of the prior art requires a separate pump, with additional maintenance requirements and potential for mechanical problems, to pump the concentrated chemicals into the recirculating system. The present invention eliminates these issues by using solid chemicals that are not subject to spills and eliminating the need for a separate pump by using the flow of the recirculating system to add the chemicals.

The prior art that uses a timed-release coating approach requires the addition of excess chemistry in order to assure that sufficient chemistry is present during times of high blowdown. In addition, the semipermeable coating that provides the timed-release must be disposed of once the chemistry is depleted.

This invention solves all of these issues. A large SCF tank allows solids to be poured in when needed with little shipping waste, the system typically operates with recirculating water, the feedback control loop assures that the right amount of chemistry is present in the recirculating water even with variable blowdown rates, and the invention can easily be made to handle larger systems simply by using a larger solid chemical feed tank.

Figure 5:
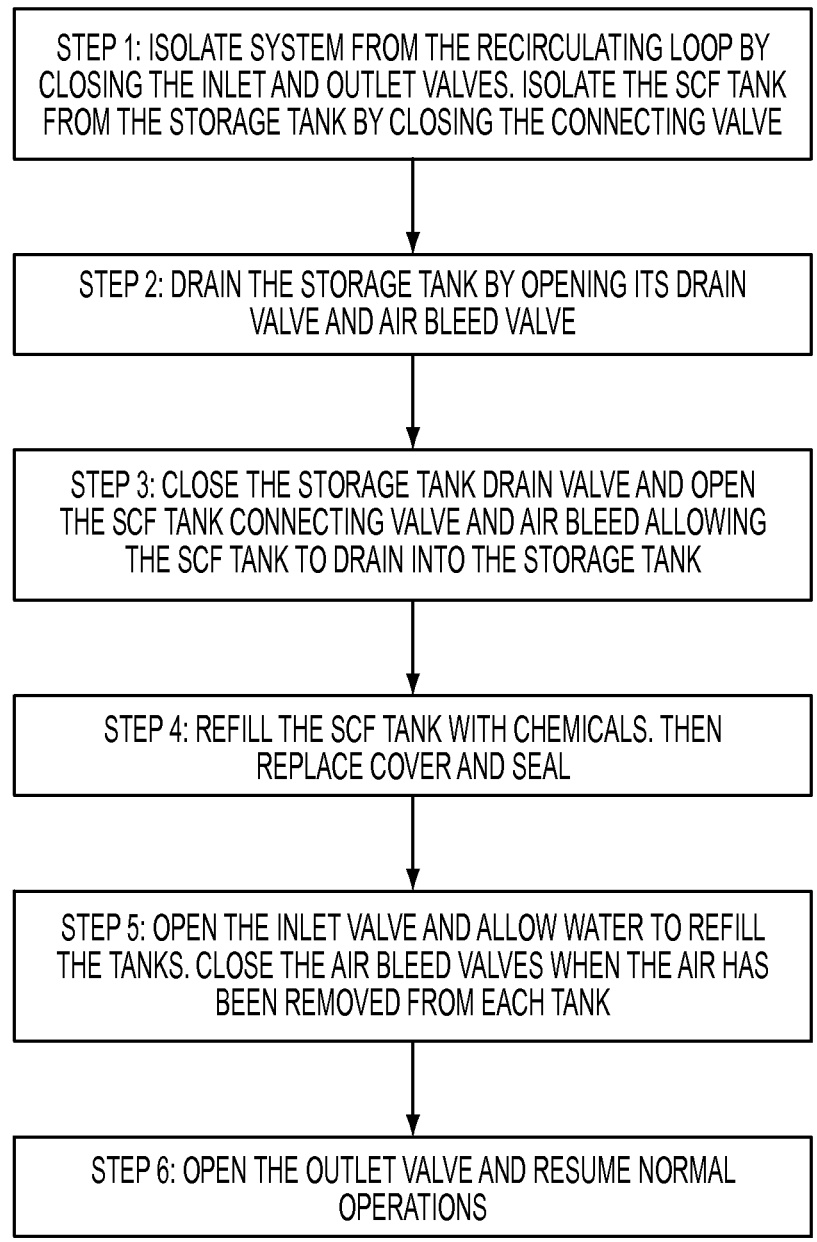
FIG. 5 shows a sequence for replenishing chemicals in a solid chemical feed tank according to an embodiment of the invention.

One potential disadvantage of the invention occurs when adding more chemicals to a partially depleted SCF tank. To add chemicals, water concentrated with chemicals must be removed. FIG. 5 details a method of using the storage tank 12 to hold unspent chemistry which solves this issue. When the SCF tank 2 needs to be replenished, the monitored release solid feed system is isolated from the recirculating water by closing valves on the inlet 44 and outlet 6. The storage tank 12 is then isolated from the SCF tank 2 by closing isolation valve 30 that connects them. Because of the water flow path, storage tank 12 is filled with recirculating water not concentrated chemicals when in an operation mode. The storage tank 12 can therefore be drained as ordinary blowdown through drain 32 by opening valve 36. An air bleed valve 34 may be used to prevent gurgling as the water is discharged. When storage tank 12 is empty, drain isolation valve 36 is closed and isolation valve 30 and air bleed valve 42 are opened allowing the SCF tank 2 to drain into the Storage Tank 12. The SCF tank water level is now lowered and additional chemicals can be easily added. Once the chemicals have been replenished, the inlet valve 38 is opened and the tanks refilled. Since the flow of water is from the storage tank 12 to the SCF tank 2, residual chemical that was drained to the storage tank 12 is gradually returned to the SCF Tank 2. When the tanks are refilled, all air bleed valves closed, the outlet isolation valve 40 is reopened, and normal operation resumes.

The monitored release solid feed system is designed to handle inhibitor chemistry where most of the chemicals are not consumed during operation but rather lost by blowdown, drift, and leaks. It is not suitable for feed of antimicrobials which are consumed in use since the active chemical would be consumed while the indicator chemical would not. Since most open cooling systems require some method of biological control a separate method of adding a biocide is required. By using a combination of this invention and the saturation limited feed system described in patent application Ser. No. 14/075,300 which is hereby incorporated in its entirety by reference, a completely solid treatment program can be provided eliminating all liquid chemicals and the pumping and handling of concentrated liquid chemicals.

Figure 6:
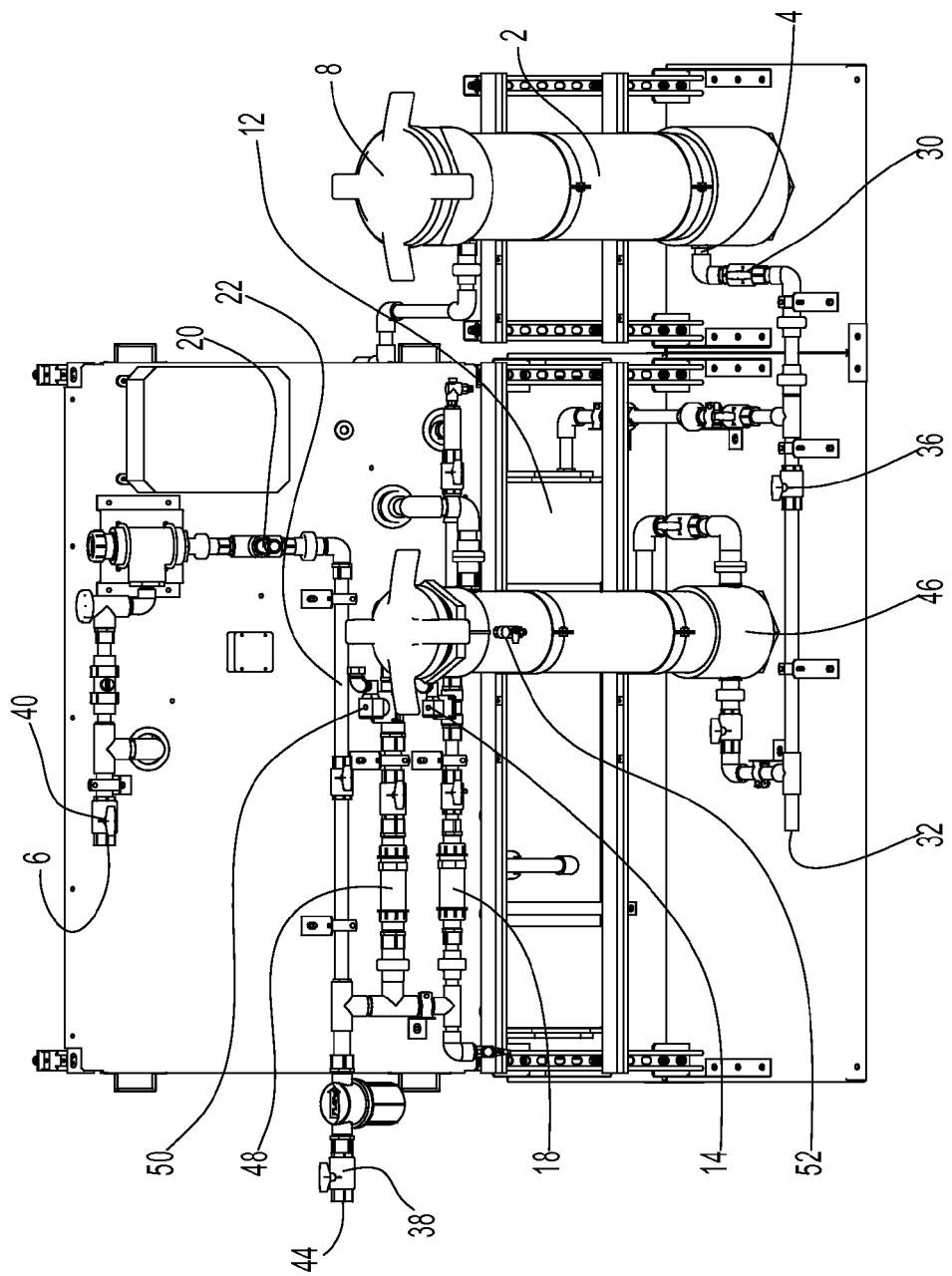
FIG. 6 is an illustration of a water treatment system which incorporates a monitored release solid feed system for chemicals that are not consumed in use and a saturation limited feed system for chemicals that are consumed in use.

FIG. 6 illustrates such a water treatment system which incorporates a monitored release solid feed system for chemicals that are not consumed in use and a saturation limited feed system for chemicals that are consumed in use. FIG. 6 shows how the monitored release solid feed system can be combined with a saturation limited feeder (SLF) 46 to provide a more complete water treatment. The outlet 6 and inlet 44 for the monitored release solid feeder is also used as the outlet and inlet for the SLF 46. FIG. 6 shows a separate SLF automated valve 50, a separate SLF flow meter 48, and the SLF air bleed valve 52. See FIG. 9 and description below for a more detailed description of a saturation limited feed system. See also, U.S. patent application Ser. No. 14/075, 300.

Figure 7:
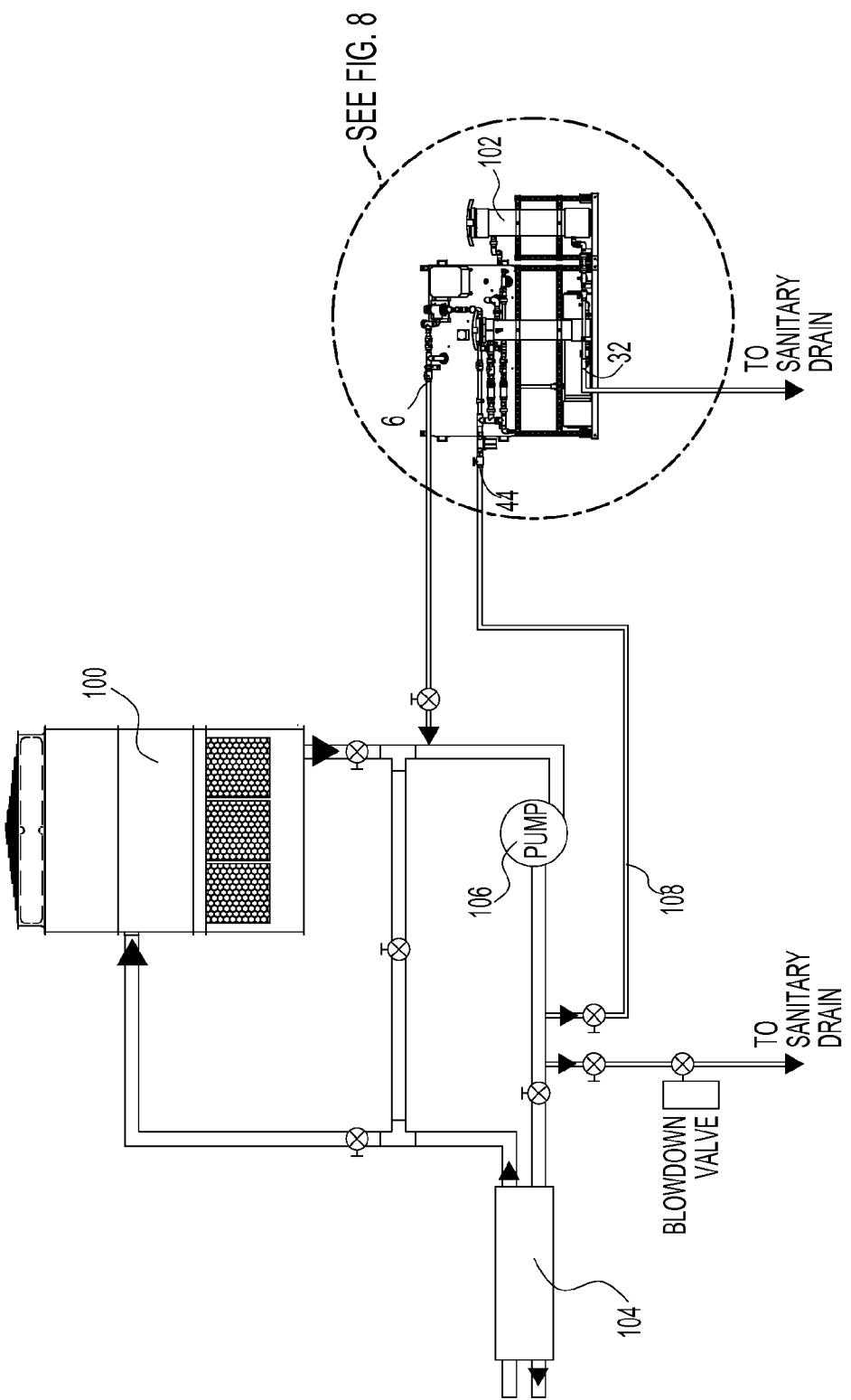
FIG. 7 shows how a water treatment system including a monitored release solid feed system can be incorporated as a sidestream of the recirculating cooling water of a cooling tower.
Figure 8:
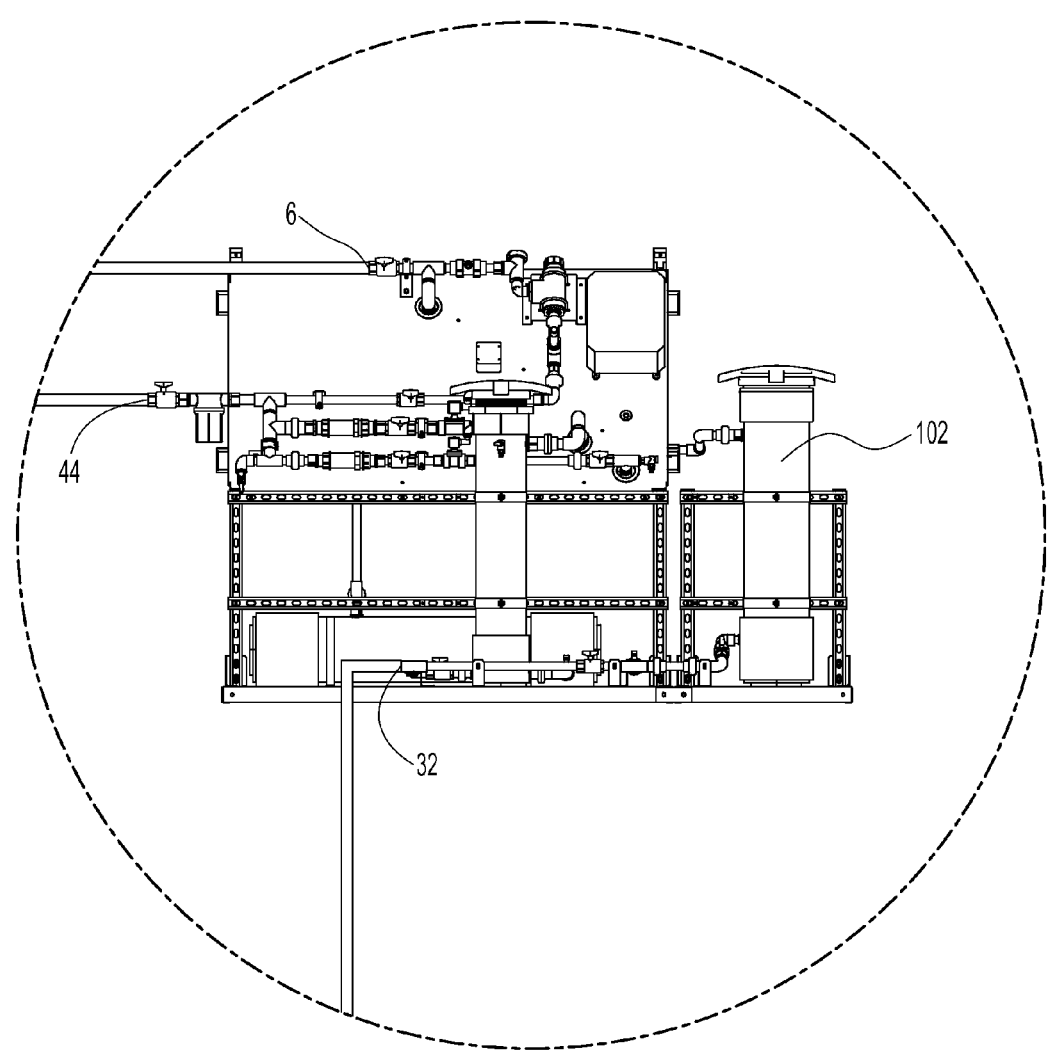
FIG. 8 is a blow-up of the combined monitored release solid feed system and saturation limited feed system shown at the lower right hand portion of FIG. 7.

FIG. 7 shows one way that the combination of a monitored release solid feeder and a SLF can be piped into the open recirculating water system of a cooling tower. Cooled recirculating water is pumped from the cooling tower 100 through the process heat exchanger 104 where it absorbs heat and then back to the cooling tower where it is cooled. A side stream loop 108 can be employed to deliver the chemistry from the water treatment system skid 102, which consists of a monitored release solid feed system and a saturation limited feed system, into the recirculating system. The recirculating water pump 106 will drive flow from the high pressure side of the pump through the side stream loop 108 and back into the recirculating system at a lower pressure point in the system.

Figure 9:
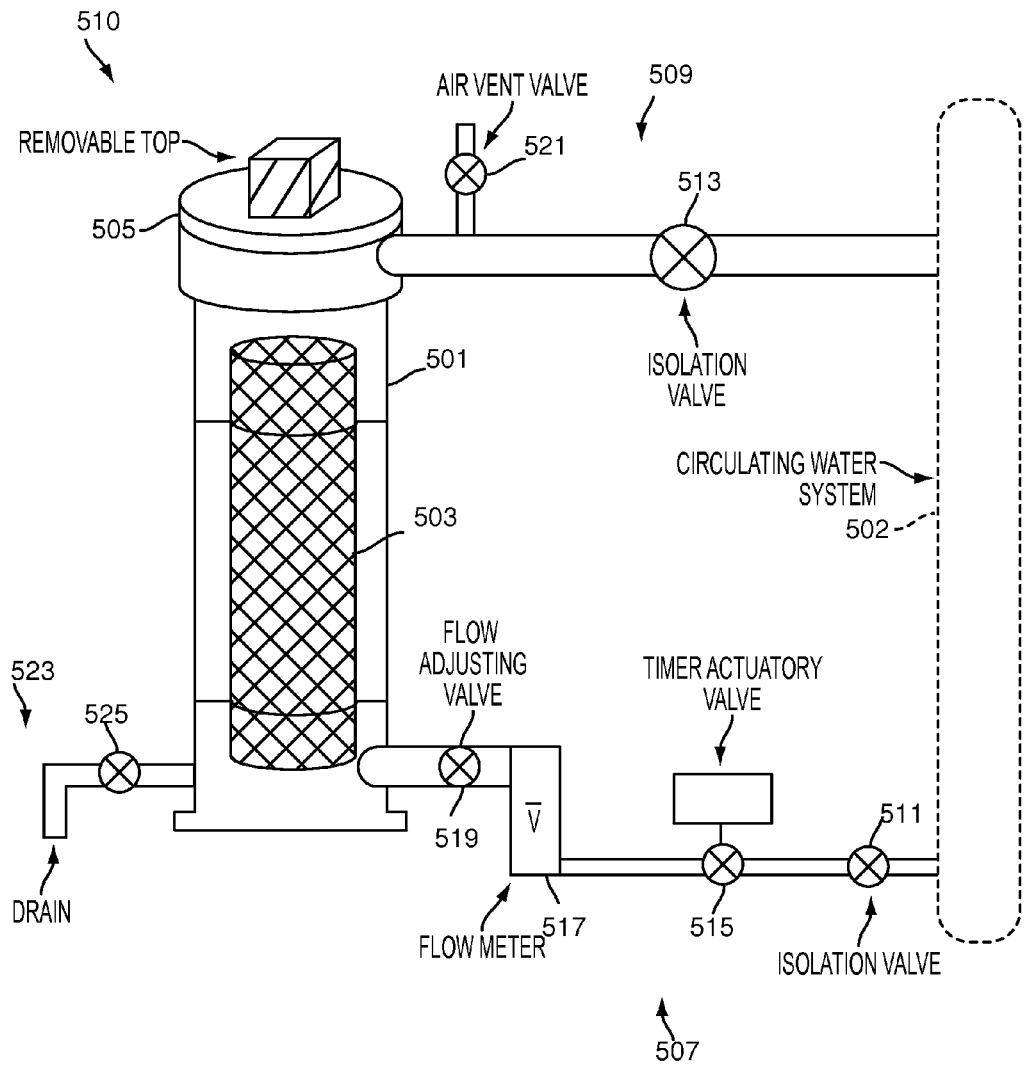
FIG. 9 is an illustration of a saturation limited feed system which may be used together with a solid chemical feed system according to an embodiment of the invention.

FIG. 9 is an illustration of a saturation limited feeder of the type illustrated at element 46 in FIG. 6. FIG. 9 illustrates the general layout of a slug feed loop 510 according to one embodiment of the invention. Section of pipe 501 (also referred to herein as slug pipe or holding tube) is configured to receive removable basket 503. According to one embodiment, the section of pipe is construction of PVC, and the basket is wire or plastic mesh. Slug pipe 501 is fitted with a removable top 505 to allow addition of chemical to the slug pipe and/or removal of the basket 503. Slug pipe 501 is connected to a circulating water system 502 by sections of pipe 507, 509. Sections of pipe 507, 509 may be fitted with isolation valves, 511, 513, and one or more of timer actuating valve 515, flow meter 517, flow adjusting valve 519 and air vent valve 521. Slug pipe 501 may also be fitted with drain section 523, including drain valve 525.

The invention claimed is:

1. An apparatus comprising:
a recirculating water system having
a recirculating water system inlet, and
a recirculating water system outlet;
a chemical feed system having
a chemical feed system inlet, and
a chemical feed system outlet;
said chemical feed system inlet connected to said recirculating water system outlet, and
said chemical feed system outlet connected to said recirculating water system inlet;
said chemical feed system further comprising a storage tank having a storage tank inlet and a storage tank outlet and a chemical feed tank having a chemical feed tank water inlet, a chemical feed tank water outlet, and chemical feed tank solid active chemical opening, said chemical feed tank configured to receive through said opening solid active chemicals and indicator-chemical and to allow said solid chemicals to dissolve or partially dissolve in water held in the tank;
a storage tank inlet connected to said chemical feed system inlet via a first fluid line having a first storage tank isolation valve, said storage tank outlet connected to said chemical feed tank water inlet via a second fluid line having a second storage tank isolation valve and configured to receive the contents of said chemical feed tank during loading of solid chemical into said chemical feed tank;
said chemical feed tank water outlet connected to said recirculating water system via a third fluid line including said chemical feed system outlet and said recirculating water system inlet;
said apparatus further comprising a measuring device for measuring the level of an indicator chemical in said recirculating water system,
an automatic valve to allow dissolved chemical held in the chemical feed tank to flow into the recirculating water system based on a measured level of said indicator chemical.

2. The apparatus of claim 1 where said measuring device for measuring the level of an indicator chemical in said recirculating water system is connected to the automatic valve via a control panel.

3. The apparatus of claim 1 where said recirculating water system is a recirculating cooling water from a cooling system.

4. The apparatus of claim 1 where said storage tank is located lower than said chemical feed tank such that said chemical feed tank can be gravity drained into said storage tank.

5. The apparatus of claim 1 further comprising a second feeder comprising:
a container having a liquid impermeable outer casing, a liquid inlet, a liquid outlet, and an opening to allow addition of solid chemicals; said container configured to hold a specific volume of liquid;
said container configured to receive a chemical such that the chemical is in intimate contact with the liquid for sufficient time to allow a portion of said chemical to become dissolved in said liquid and for said liquid to become saturated with said chemical;
at least one valve configured to allow saturated liquid in the impermeable container to flow into the circulating water system and to replace the saturated liquid with unsaturated liquid,
wherein undissolved solid chemical is inhibited from leaving the liquid impermeable container.

6. A apparatus according to claim 5, wherein said at least one valve is configured to allow unsaturated liquid to enter the impermeable container and flush the saturated liquid into the circulating water system.

7. A apparatus according to claim 6 wherein said at least one valve is configured to allow said flush to extend for a longer period of time than necessary to replace the saturated water, thereby allowing additional chemical to be released as new water that enters the container dissolves additional solid chemical.

\* \* \* \* \*